United States Patent

[11] 3,616,009

| [72] | Inventors | Lee F. Rost;<br>William H. Taylor, both of Covina, Calif. |
|---|---|---|
| [21] | Appl. No. | 44,346 |
| [22] | Filed | June 8, 1970 |
| [45] | Patented | Oct. 26, 1971 |
| [73] | Assignee | Koningsplein, N. V. |
| [23] | | Division of Ser. No. 715,677, Mar. 25, 1968, Pat. No. 3,562,064 |

[54] DECORATIVE SHEETING FABRICATING METHOD
4 Claims, 8 Drawing Figs.

[52] U.S. Cl............................................. 156/210, 156/155, 156/310
[51] Int. Cl.............................................. B31f 1/28
[50] Field of Search........................................ 156/210, 310, 314, 474, 470, 309, 155

[56] References Cited
UNITED STATES PATENTS

| 1,588,452 | 6/1926 | Greenstreet................. | 156/474 |
| 2,926,720 | 3/1960 | Gosman....................... | 156/470 X |
| 3,383,192 | 5/1968 | Siegmund..................... | 156/155 X |
| 3,385,744 | 5/1968 | Van Sciver................... | 156/310 |
| 3,574,105 | 4/1971 | Sachs........................... | 156/155 X |

*Primary Examiner*—Samuel Feinberg
*Assistant Examiner*—G. E. Montone
*Attorney*—Boyken, Mohler, Foster & Schwab

ABSTRACT: A method for forming decorative sheeting which include means for bringing two independent sources of thin, flexible material to a single point for continuously forming such sheeting. The process of forming such sheeting includes the use of two separate bonding materials, one of which is quick acting but forms only a temporary bond and the other of which is slow acting, but forms a permanent bond between the materials from the two separate sources. The process also reduces the size of the material from one source to approximate the size of the material from the other source and also ruffling or producing a random appearance of the material from said one source when it is mated with and bonded to the material from said other source.

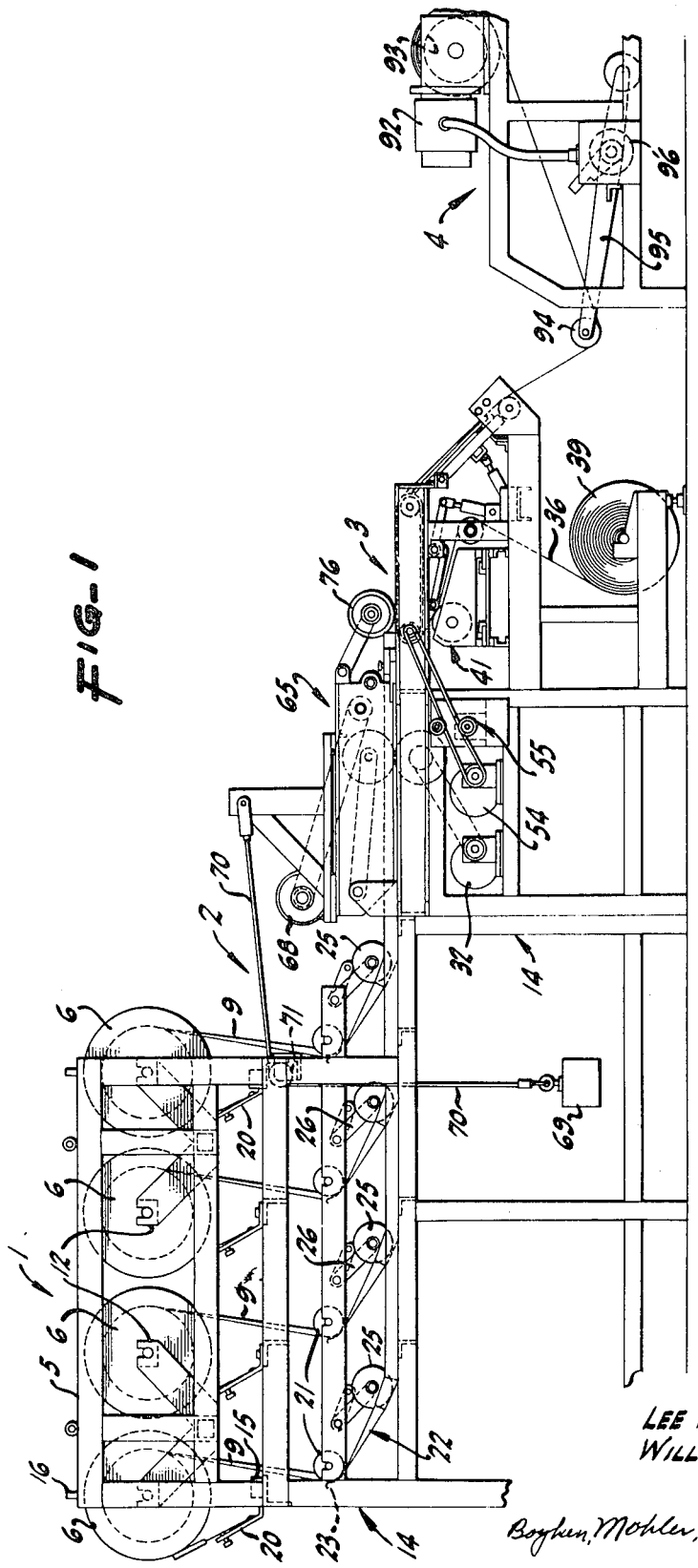

PATENTED OCT 26 1971 3,616,009
SHEET 2 OF 4
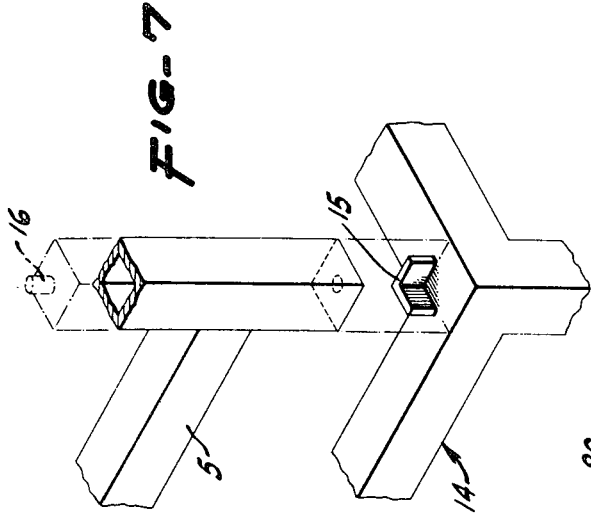
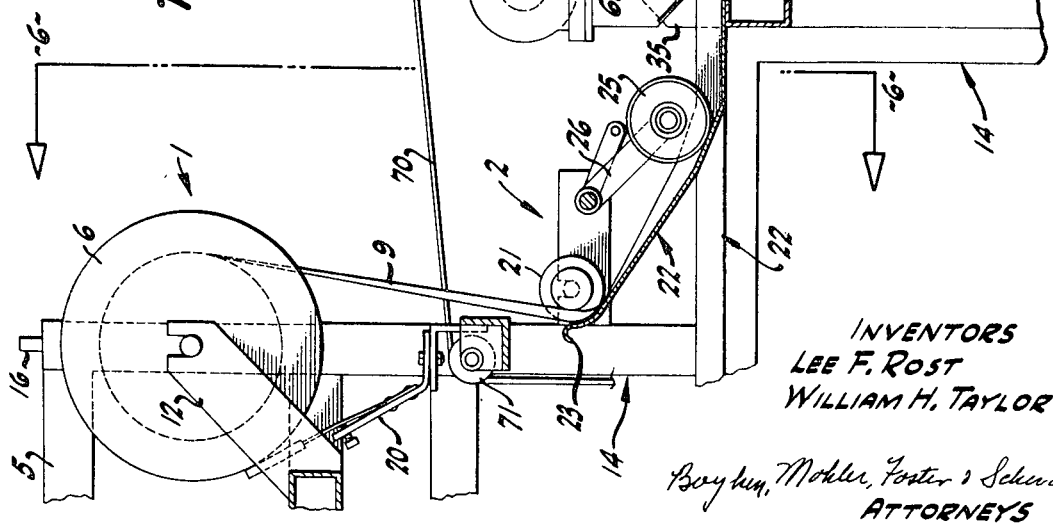
INVENTORS
LEE F. ROST
WILLIAM H. TAYLOR
Boyken, Mohler, Foster & Schwab
ATTORNEYS

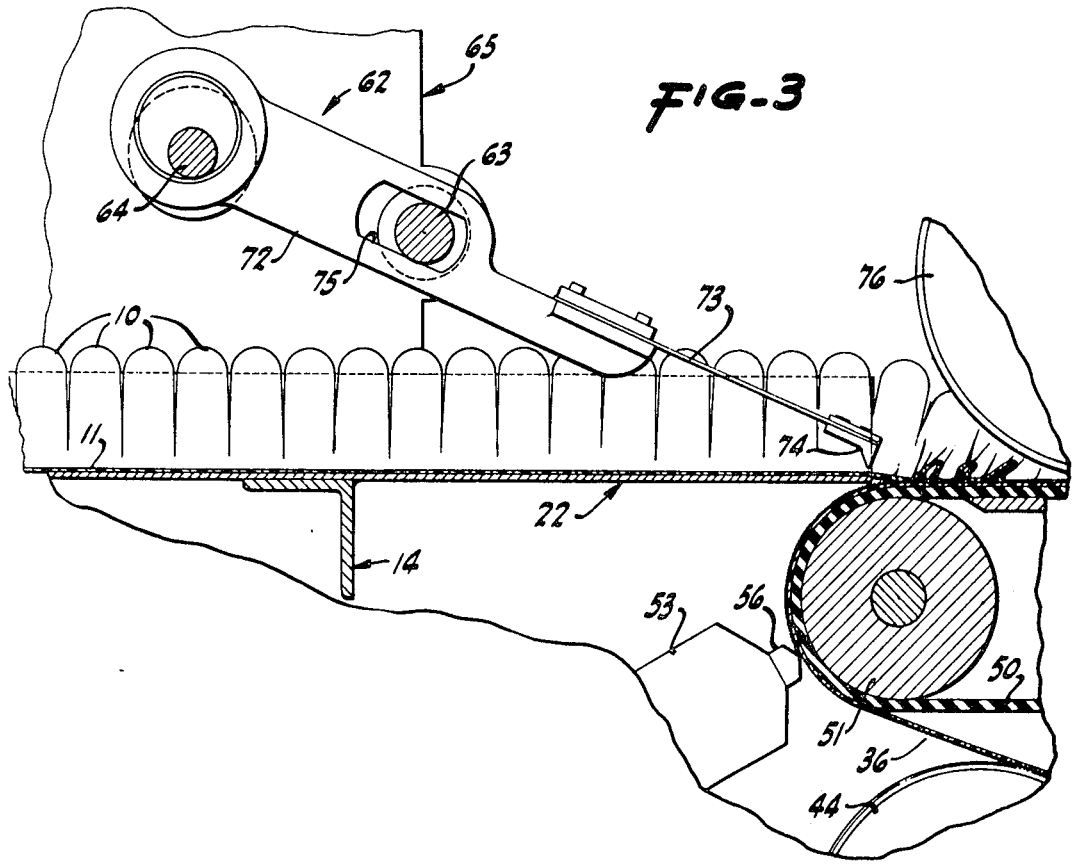
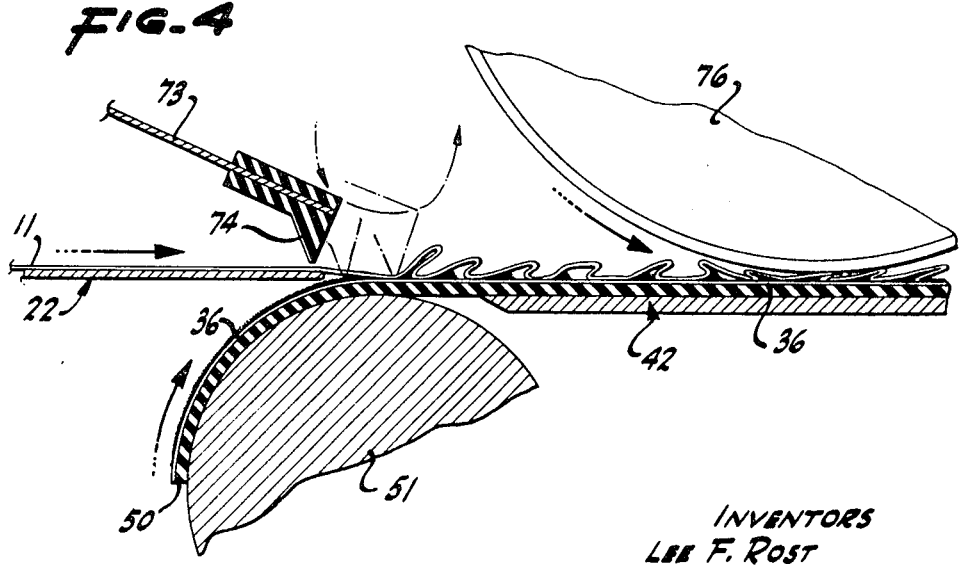

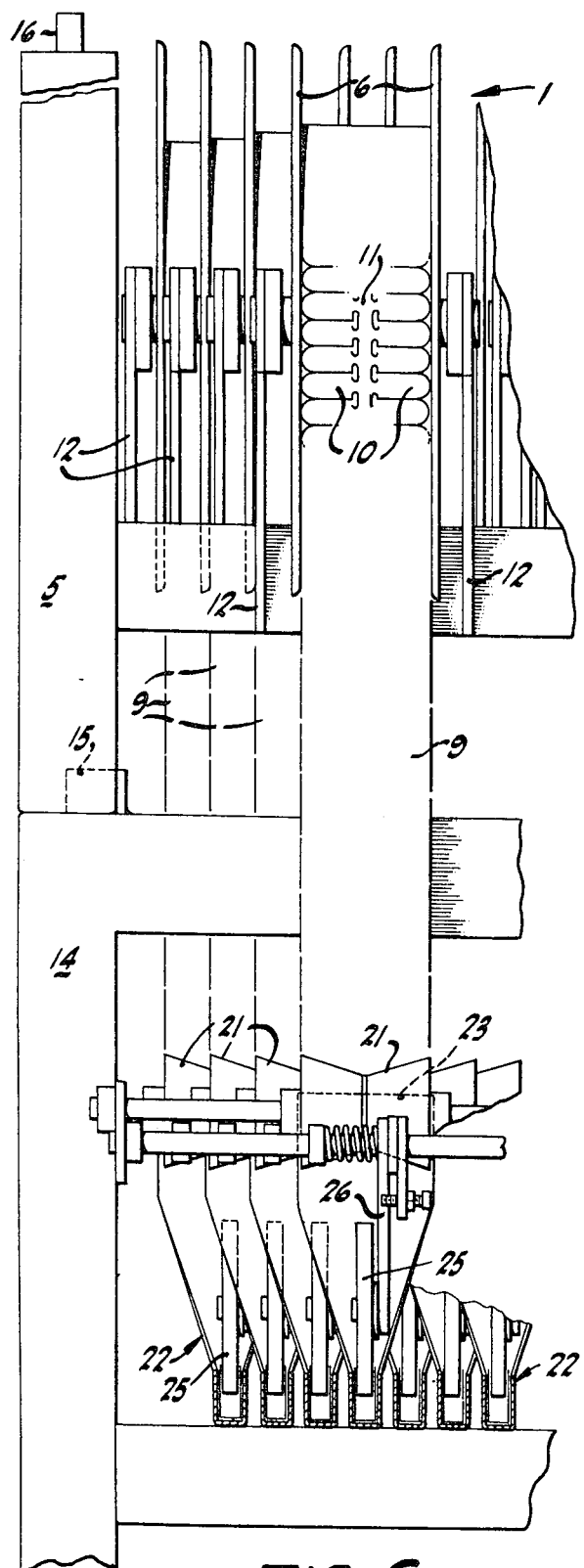
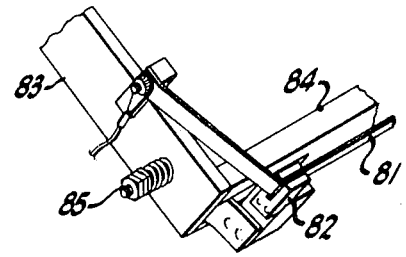
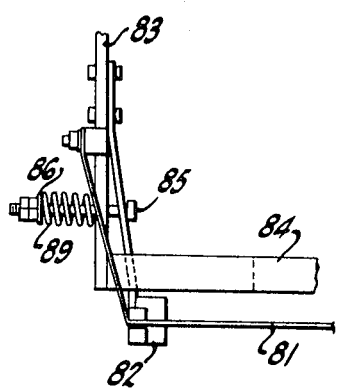
FIG. 5
FIG. 5A
FIG. 6
INVENTORS
LEE F. ROST
WILLIAM H. TAYLOR
Boykin, Mohler, Foster, & Schwab
ATTORNEYS

DECORATIVE SHEETING FABRICATING METHOD

This application is a divisional of copending application Ser. No. 715,677, filed Mar. 25, 1968.

The present method contemplates the fabrication of decorative sheeting, sometimes referred to as floral sheeting, which is used in decorating such things as parade floats, platforms and the like, giving the thing decorated the appearance of having been made with flowers or flower petals.

Floral or decorative sheeting of the type herein contemplated is generally made by securing a plurality of what may be called petal resembling strips to a backing sheet. In ultimate use the product may be draped over a foundation structure such as chick wire in a formation of a float or other decorative piece.

At best, prior attempts to fabricate artificial floral sheeting have been only partially automated and the product has been inordinately expensive due to the hand labor involved. The product has normally been commercialized in individual pieces of 1 square yard, thus necessitating a substantial amount of waste on the part of the user.

Most prior floral sheetings have been made of basically unsatisfactory materials. Some has been made of fabrics which are expensive initially, fade in sunlight and wilt in excessive moisture or rain, both of which conditions are likely to be encountered in the anticipated use of floral sheeting. Other attempts have been made to fabricate floral sheeting from paper products and, along with the disadvantages of using fabrics, paper products, present a substantial fire hazard and may completely disintegrate should a float made therefrom encounter rain.

Applicants' process and apparatus provides for automated manufacturing of decorative floral sheeting from fire-resistant plastic materials which are unaffected by the wide range of climatic conditions likely to be encountered in the use of the product. The use of this desirable material presents substantial problems which applicants have had to overcome. The material is very thin and very flexible and must be handled with particular care. The petal strips cannot be stitched to the backing strip as in sewing, since each puncture would provide a point of weakness and the material would quickly tear apart. The plastic of the petal strip and the backing sheet cannot be bonded together by the usual adhesives since it is not porous. It can be welded or bonded together by solvents which tend to fuse the petal strip to the backing sheet, but these solvents take many hours to perform their function and cure, establishing a secure bond. Faster acting solvents would be totally destructive of the thin and fragile materials, used by applicants in forming their floral sheeting.

It is therefore, a primary object of the present invention to provide method and apparatus for forming decorative sheeting by a continuous process, thereby minimizing waste on the part of the user.

Another primary object is to provide method and apparatus for forming decorative floral sheeting from thin, flexible plastic materials. It is yet another object of this invention to provide apparatus and method for bonding plastic materials together in the continuous formation of decorative floral sheeting.

Still another object of the present invention is to provide method and apparatus for continuously forming floral sheeting wherein a plurality of petal strips are bonded to a single backing sheet, said petal strips being ruffled to provide a flower petal appearance.

It is yet another object of the present invention to provide apparatus and method for forming decorative floral sheeting wherein the sheeting can be of any practical desired length, and when a desired length is reached, the formed product can be severed from the product being formed by novel severing means.

It is yet another object of the present invention to provide apparatus and method for forming decorative floral automated apparatus for forming decorative floral sheeting wherein the source of the petal strips used in the formation of the product can be instantly replaced when one source thereof has been expended.

These and other objects will be apparent from the description taken in conjunction with the drawings in which:

FIG. 1 is a side elevational view, partially broken away, of the apparatus of the present invention also illustrating a decorative sheeting takeup device which may be used in conjunction therewith;

FIG. 2 is an enlarged longitudinal sectional view of the intermediate portion of FIG. 1;

FIG. 3 is a greatly enlarged longitudinal sectional view of a portion near the right-hand end of FIG. 2;

FIG. 4 is a greatly enlarged, semidiagrammatic view of the apparatus and action of the present invention at the point at which a petal strip is mated with backing sheet;

FIG. 5 is a perspective view of a portion of the decorative sheeting severing element of the present invention;

FIG. 5a is a plan view of the device of FIG. 5;

FIG. 6 is a cross-sectional view as seen substantially along line 6—6 of FIG. 2;

FIG. 7 is an isometric view of magazine mounting structure.

In general, the apparatus of the present invention consists of a number of stations which can be separately described. For purposes of this description, the forward end of the machine will be considered the right-hand end as seen in FIG. 1. The various stations may generally be described as the petal strip storage station or magazine 1, the petal strip conveying and forming station 2, the petal strip and backing sheet mating station 3, and takeup station 4.

More specifically, magazine station 1 includes a box like frame member 5 which is adapted to support a plurality of reels 6 of elongated, preformed petal strip 9 (FIGS. 2, 4 and 6).

It can be assumed that the petal strip is formed and wound about reels 6 independently of the apparatus of the present invention. The petal strip used herein may be formed from any of several commercially available plastic sheet materials, and in the present instance, it is formed to provide two spaced rows of oppositely outwardly extending petal like structures 10, each of which may be severed from the other, but all of which are joined together in a petal strip 9 by a web 11 extending between the inward ends of the petals 10.

Each reel 6 of petal strip 9 is removably, rotatably mounted in a pair of armatures 12 which are in turn secured to frame 5. Magazine 1 may include any number of rows of reels 6 and each such row may include any desired number of individual reels 6. In the present example, as seen in FIG. 1, there are four rows of reels and each row contains six reels. The petal strip in the present example is approximately 4 inches wide.

Magazine 1 is adapted to be removably mounted on a major frame member generally designated 14. As seen in FIGS. 2 and 7, the depending legs of magazine 1 are adapted to be received from above by frame 14, and held in place thereon by positioning blocks 15, one for each depending leg. Positioning dowels extending upwardly from frame 14 could as well serve the purpose, and are in fact used at each upper corner of frame 5 as at 16, to stack a plurality of magazines together, dowels 16 on one magazine being adapted to be received within apertures 17 (FIG. 7) in the legs of another similar magazine. Thus, provision is made in the present apparatus for removing a magazine 1 from frame 14 when the reels thereof have been expended, replacing the magazine with one similar thereto having full reels.

Each reel 6 may have a retarding member 20 in frictional engagement therewith to restrain the rotation of the reel in operation so that it dispenses only the required amount of petal strip without undesirable slack. For economy, retarding members 20 may be mounted on frame 14, each in a position to frictionally engage its respective reel as magazines 1 are interchanged.

Rotatably mounted in frame 14 are a plurality of positioning rollers 21 (FIGS. 1, 2 and 6), one such roller being below and in alignment with each reel 6. Each roller 21 has a concaved surface which is adapted to be engaged by a petal strip 9 as it is dispensed from a reel 6, centering such petal strip in its path of travel and providing a desirable deformation of such strip in such path of travel.

Adjacent each roller 21 is the rearward terminal end 23 of a plow member which will generally be designated 22. The positioning of rollers 21 and plow ends 23, is such that a petal strip is intended to pass between the two. Initially, plow end 23 is formed flat to receive a basically flat petal strip and shortly thereafter side members 24 are formed on plow 22, which side members converge and increase in depth, forcing the petals 10 of a petal strip into substantially vertical positions. An idler roller 25, held down by its own weight, may be positioned between the sides 24 of each plow 22. This roller assures that each petal strip follows and maintains the U-shaped conformation of its respective plow.

It can be seen that the purpose of the concaved surface of each roller 21 is to bend petal strip passing thereby first in one direction prior to being forced in the opposite direction by the sides 24 and plow 22. It has been found that by applying these forces to petal strip 9, the individual petals 10 thereof will maintain vertical positions as they pass forwardly along channel shaped plows 22 and the individual petals will not tend to fall toward each other, becoming creased and intertwined. It may be noted that each of rollers 25 is rotatably mounted upon a swingable armature 26, both of which can be lifted and suspended upwardly of and out of plows 22 when petal strips are being threaded into the apparatus.

Means for unreeling petal strips from reels 6 and for advancing it along plows 22, is provided in conveying and forming station 2. Rotatably mounted above and below the path of travel of each petal strip are a pair of pinch or feed rollers, one of which may be driven and the other of which may frictionally engage the periphery of the driven roller. In the present example, driven rollers 29 are rotatably mounted on frame 14 by means of a common shaft 30. The peripheral edge of each feed roller 29 extends upwardly through an elongated opening 31 in the bottom of the U-shaped plow 22 to which it is associated. The peripheral edge of feed roller 29 may be coated with a friction increasing material and extends sufficiently into plow member 22 to engage a petal strip passing therealong. In the present example, feed roller 29 is independently driven by its own variable speed electric motor 32 through any desirable connection such as a timing belt or a chain and sprocket arrangement.

Rotatably mounted immediately above the driven feed roller 29, is a rotatable idling feed roller 33. The periphery of roller 33 may also be coated with a friction increasing material, and the periphery of said roller is adapted to yieldably engage the periphery of roller 29 or to pinch a petal strip passing therebetween. Roller 33 is mounted at one end of an armature 34, the opposite end of which is pivotally supported on a mounting block 35, which is in turn mounted on frame 14. It can be seen that roller 33 can be lifted upwardly of roller 29 to allow a petal strip to be threaded therebetween. Roller 33 also serves to maintain the vertical disposition of the petals 10 of a petal strip 9 as it moves therepast.

Forwardly of feed rollers 29, 33, is the mating station 3 of the present apparatus at which petal strips 9 are brought into mating contact with a backing sheet 36, to be bonded therewith in the formation of decorative floral sheeting. Rotatably mounted in an extension of frame member 14 at the mating station, is a relatively large roll 39 of backing sheet 36. In the present apparatus the roll 39 is mounted below the path of travel of the petal strip. Backing sheet being unwound from said roll extends upwardly and around a guide roller 40, passing then over a solvent applicator generally designated 41, and around the end of a generally horizontally disposed conveyor 42, past the point of initial contact with petal strips 9, which point may be referred to as the mating point.

The means whereby petal strips are permanently joined to backing sheet 36, is a commercially available solvent which reacts with the synthetic plastic material of the petal strips and the backing sheet, affecting a weld between the two. In the present instance, the solvent applicator includes a reservoir 43 in which liquid solvent can be stored. The solvent is applied to the mating surface of backing sheet 36 by means of a rotatable applicator roller 44, the absorbent peripheral edge of which is adapted to extend down into the solvent in reservoir 43. In the present apparatus, a thin line of solvent is continuously deposited upon the mating surface of backing sheet 36 for each petal strip 9 to be attached thereto.

For purposes of illustration only, the decorative sheeting fabricated by the present apparatus consists of a backing sheet and 24 equally spaced rows of petal strip attached thereto. In this example, there would be one solvent applicator roller for each row of petal strip and the line of solvent deposited by said roller on the mating surface of backing sheet 36 would be in alignment with its respective row of petal strip.

The solvent is deposited on said mating surface by rotating roller 44 through the solvent in reservoir 43 and then by continued rotation, wiping the peripheral edge of said roller against said mating surface as it passes thereover. In order to have contact between backing sheet 36 and solvent applicator rollers 44 only while the machine is in operation, a depressing roller 45 is mounted above said backing sheet to press said sheet into contact with applicator roller 44 during operation. Roller 45 extends the width of backing sheet 36 and is rotatably supported at each of its ends in pivotally mounted armatures 46. A pneumatic cylinder 49, or any other desirable means, may be used to pivot armature 46 to raise and lower depressing roller 45 out of and into operative relation with the peripheral edges of applicator rollers 44.

The apparatus of the present invention is designed to be used with a wide variety of decorative sheet forming materials. The materials may differ not only in composition, but in thickness, requiring different quantities of solvent in order to effect a secure bond between petal strips and the backing sheet. Thus, applicator rollers 44 may be driven by a variable speed electric motor and the quantity of solvent deposited on the mating surface of backing sheet 36 is varied by the speed of rotation of said applicator rollers. Further, in the present apparatus, each applicator roller 44 has a pair of strips of absorbent material extending around the peripheral edge thereof. Therefore, two lines of solvent are deposited upon the mating surface of backing sheet 36 for each petal strip to be bonded therewith. In some applications it may be necessary to deposit only a single line of solvent on said backing sheet for each petal strip.

Conveyor 42 includes an endless belt 50 which is substantially the same width as backing sheet 36 and which extends between and around a driven roller 51 and an idler roller 52. The outer surface of belt 50 is adapted to frictionally engaged backing sheet 36, carrying said backing sheet past an adhesive applicator generally designated 53. Roller 51 is driven, through any desirable linkage such as a timing belt, by a motor 54. The speed of motor 54 can be varied, thereby varying the feeding of backing sheet 36 from roll 39, which in effect varies the speed of output of completed decorative sheeting from the present apparatus.

Mounted on frame 14 and adapted to engage one of the runs of the timing belt extending between motor 54 and roller 51, is a pulse counter 55. Said pulse counter is adapted to register the feed of backing sheet 36, thereby ascertaining the amount of fabricated decorative sheeting which passes any given point. In the present example, the pulse counter may generate a pulse and transmit it to a tabulator upon each rotation thereof indicating that say, 6 inches of backing sheet 36 have been fed from roll 39. The tabulator can be adjusted to actuate the severing device upon every six pulses of the pulse counter thereby severing fabricated decorative sheeting from that being fabricated in 1 yard lengths, as has been done in the past. Also, the tabulator can be adjusted to actuate the severing device at any other desired multiple of 6 inches, or it can be disengaged, allowing the apparatus to continue to produce fabricated decorative sheeting until the sources of backing sheet or petal strips are exhausted. The severing device and its operative relation with the pulse counter will be described in greater detail later.

Adhesive applicator 53 consists of a plurality of individual nozzles 56, each being so positioned and adapted to apply a relatively thin line of deposit of adhesive to the mating surface of backing sheet 36 moving therepast between said nozzles and the outer surface of belt 50 of conveyor 42. As with the solvent applicator, rollers 44, there is one nozzle 56 for each row of petal strip to be attached to said backing sheet and said nozzle is generally aligned with its respective row of petal strip.

The line of adhesive deposited by each nozzle 56 is slightly to the side of and generally parallel with its corresponding line of solvent as applied by rollers 44. In the example in which two lines of solvent are deposited by each roller 44, the line of adhesive deposited by nozzle 56 will generally be placed on backing sheet 36 between the lines of deposit of solvent in each pair thereof. In such example, there would be one line of adhesive and two lines of solvent for bonding each petal strip to the backing sheet.

The plurality of nozzles 56 are connected by a single manifold conduit 59 to a reservoir 60 for adhesives. With many of the materials which may be chosen for use with the present apparatus for forming decorative floral sheeting, it has been found that a hot melt adhesive is preferable to a cold adhesive primary because of the quicker setting time. Should a hot melt glue or adhesive be used with the present apparatus, it should be understood that reservoir 60, conduit 59 and nozzles 56 will all be heated so that the the adhesive will not set prior to being applied to the mating surface of backing sheet 36. It will also be noted that when hot melt glue is used, nozzles 56 should be positioned as closely to the mating point between the petal strips and backing sheet 36 as possible in order to minimize setting time between the application of the glue to the backing sheet and the time in which the petal strips are brought into mating contact.

After backing sheet has passed adhesive nozzles 56 and extends around to the upper run of belt 50, the backing sheet 36 with the solvent and adhesive applied thereto, then moves in a path generally parallel to and closely adjacent the paths of the petal strips 9. At approximately the mating point between the petal strips and the backing sheet, each of the plurality of plows 22 is coterminus as at 61. At this point, each petal strip in its respective path of travel passes beneath a ruffling finger generally designated 62 and illustrated in FIGS. 3 and 4.

Ruffling fingers 62, one for each petal strip line, are pivotally mounted on a pair of shafts 63 and 64, which extend transversely of the paths of travel of the petal strips 9 and which are in turn mounted at their outer ends in a subframe assembly generally designated 65. Frame assembly 65 is pivotally secured above main frame assembly 14 by the same shaft 66, which secures armatures 34 and idler feed roller 33 to blocks 35 which are secured to frame 14.

As seen in FIG. 1, frame 65 is connected to a counter weight 69 by a rope 70 extending across a pulley 71 which is in turn rotatably mounted on frame 14. Thus, it can be seen that subframe 65 and everything mounted thereon, including fingers 62, can be rotated upwardly and away from the paths of petal strips 9, thereby facilitating the threading of said strips through the present apparatus.

Ruffling fingers 62 include a permanent support member 72 to the lower end of which is secured a replaceable ruffler 73. Ruffler 73 is basically a yieldable leaf spring having a petal strip engaging tip 74 on the lower end thereof. Support member 72 is formed with a longitudinal slot 75 about midway thereof which slot is adapted to receive mounting shafts 63 therethrough. The other finger mounting shaft 64 is eccentrically received through the end of support member 72 opposite ruffler 73 in such a manner that when shaft 64 is rotated through its operative connection with motor 68, support member 72 pivots about shaft 63 and oscillates with respect thereto imparting a generally rotary motion to tip 74.

As seen in FIG. 3, if shaft 64 is rotated in a clockwise direction, the movement imparted to tip 74 will be such that said tip will engage a petal strip 9 passing therebeneath and said tip will move forward with said strip for a short distance until it is lifted free from said strip and returned on its rotary motion to again engage said strip at a point rearwardly of the prior point of engagement. The speed of movement of the petal strips 9 with relation to the backing sheet 36 and in relation to the movement of tip 74 of the ruffling fingers 62 is such that the petal strips will be ruffled up, as illustrated in FIG. 4 and as will be more fully described in connection with the operation of the present apparatus.

From the mating point at which ruffling fingers 62 force petal strips 9 into engagement with backing sheet 36, said strips and said sheet are at least temporarily bonded by the quick action of the adhesive while a more permanent bond is being effected by the action of the solvent. From the mating point, the mated decorative sheeting passes forwardly beneath gravity actuated idler rollers 76. There is one roller 76 for each row of petal strip passing therebeneath and each such roller is generally aligned with the line of deposit of adhesive which at this point is between the backing sheet and its respective row of petal strip. The plurality of rollers 76 are rotatably mounted on a shaft 79 which is in turn mounted at its ends in a pair of armatures 80. Armatures 80 are pivotally mounted at their opposite ends on subframe assembly 65 so that rollers 76 can be pivoted away from the paths of travel of the petal strips independently of subframe assembly 65. Rollers 76 constitute a weight which presses each petal strip into firmer engagement with backing sheet 36 along each line of deposit of adhesive.

The now fabricated decorative sheeting moves forwardly of the present apparatus past a severing blade at which predetermined lengths of the fabricated sheeting can be severed from that which is in the process of being fabricated. It should be understood that there are several means whereby the decorative sheeting can be severed and to a certain extent the severing means may be dictated by the material used in fabricating the decorative sheeting. In the present example, applicants have devised a heat blade which works quickly and accurately on the plastic materials used in fabricating the present decorative sheeting.

As seen in FIGS. 1, 2 and 5, the heat blade extends transversely of the path of travel of the fabricated decorative sheeting and in the present form is located beneath the decorative sheeting. The heat blade includes a heating element 81 of a length greater than the width of the floral sheeting passing thereover, which heating element is tautly suspended between two insulated end posts 82 which are in turn mounted on a pair of armatures 83 the opposite ends of which are pivotally secured to an extension of frame member 14. The outer ends of armatures 83 may be joined by a crossmember 84.

Heating element 81 is connected to a source of electricity and when heated and brought into contact with the plastic material of the present decorative sheeting, instantly cuts through such material severing sheeting which has been fabricated from that which is being fabricated. In order to allow for expansion and contraction upon the heating of element 81, the insulated end posts are mounted on a tensioning device which includes a bolt 85 secured to each end post and slidably extending through an aperture and each armature 83, the end of said bolt outwardly of armature 83 having a collar 86 secured thereto. A coil spring 89 is positioned around bolt 85 and reacts between collar 86 and armature 83 to provide constant tension on end posts 82 and therefore heating element 81.

Heating element 81 may be moved into and out of the path of decorative sheeting by any convenient means. In the present example, a pneumatic cylinder 90 reacts between a member of frame 14 and armatures 83 to move heating element 81 to and from a cutting position. A pair of transverse bars 91, between which element 81 is adapted to pass, may be positioned above the decorative sheeting to offer resistance when said heating element is moved into the path of said sheeting.

Through standard electrically actuated pneumatic valve arrangements, the cylinder 91 can be made to actuate to sever decorative sheeting in response to pulse counter 55. If pulse counter 55 measures 6 inch intervals of backing sheet 36, and it is desired to sever the decorative sheeting in 1 yard intervals, cylinder 90 can be made to actuate upon every six pulse generated by pulse counter 55. Likewise, the decorative sheeting can be severed at any multiple of the distance measured by the pulse counter between generation of pulses.

Should the decorative floral sheeting be desired in individual pieces of say 1 square yard, they can be stacked into a shipping container of the like as they are severed by heating element 81. However, the continuous operation of the present apparatus makes it possible now to provide users with greatly elongated sheets of decorative sheeting which may be rolled up for shipping and storage. Toward that end, takeup station 4 cooperates with the output of the fabricating apparatus to roll the fabricated decorative sheeting into rolls of any desired and practical lengths. Takeup station 4 includes a variable speed electric motor 92 which is adapted through a proper gearing arrangement to rotate a core 93 around which is wound the fabricated decorative sheeting. The speed of motor 92 is responsive to the output of fabricated decorative sheeting in that the sheeting may be looped beneath a transverse bar 94, which is in turn connected to an armature 95 which operates a resistance-type speed regulator 96. If the output of fabricated decorative sheeting is running faster than the current speed of motor 92, the loop beneath bar 94 becomes greater allowing arm 95 to drop, thereby decreasing the resistance in speed regulator 96 and increasing the speed of motor 92. Conversely, if motor 92 is running too fast for the output of fabricated decorative sheeting, the loop beneath bar 94 decreases raising bar 94 and armature 95, thus increasing the resistance within speed regulator 96 and decreasing the speed of motor 92.

In operation, the respective reservoirs of adhesive and solvent would be filled to the proper levels and if a hot-melt glue is being used, the electrical system therefore would be actuated. When starting with a fresh supply of backing sheet 36 the roll 39 thereof would be rotatably placed in its mounting in frame 14 and threaded around roller 40 and past the solvent and adhesive applicators and over conveyor 42. To facilitate such threading, subframe member 65 would be pivoted upwardly away from the paths of travel of the petal strips 9.

A magazine 1 containing full reels 6 of petal strip 9 would be secured in its position over frame 14 and the petal strip from each individual reel would be unreeled therefrom and passed beneath its respective rollers 21 and 25 into its respective U-shaped plow and channel member 22. At this point, the roller 25 may be dropped into place within said channel and the petal strip is pulled forwardly to approximately the mating point or shortly therepast. When this operation has been performed for each petal strip, the subframe assembly 65 is then lowered and locked into place, bringing idler roller 33 into petal feeding relationship with driven roller 29.

The lowering of frame 65 also places the tips of ruffling fingers 62 into position to ruffle the petal strip as it passes therebeneath. When all systems are ready, the various driving motors and pneumatic cylinder 49 are actuated and the ruffling fingers start ruffling the faster moving petal strip into the tacky deposit of hot melt adhesive which is beneath each petal strip on the mating surface of backing sheet 36. With the process started, weight rollers 76 are lowered into place and the process continues until there is an expenditure of a needed item.

It might be pointed out that the adhesive system may include a pressurized reservoir or a pump to effect adhesive flow. It might also be noted that the action of ruffling fingers 62 may be staggered with respect to one another. Referring to FIG. 4, it can be seen that the ruffling finger tip 74 frictionally engages the petal strip passing thereunder. The action of the finger mashes the petal strip into initial contact with the deposit of adhesive previously placed in alignment with said strip and said tip on the backing sheet. As the action of the ruffling finger continues it forms a ruffle that might be likened to a pleat in the petal strip which is moving faster than the backing sheet, said ruffle or pleat including within it some of the deposit of fast setting hot melt glue. The ruffled petal strip then moves at the same speed with the backing sheet beneath the weighted rollers 76 where the strip and the sheet are further mashed together. The hot melt glue cools and sets very quickly bonding the petal strips to the backing sheet in a ruffled condition.

While the ruffler tip 74 and the weighted rollers 76 are establishing firm contact between the petal strip and the backing sheet with the adhesive, they are also establishing contact between the two along the line of deposit of the solvent. The dissolving and welding action of the solvent starts immediately but takes a substantial length of time to reach a cured state at which the two pieces of plastic are securely and relatively permanently joined together. During this interval, the hot melt glue forms a sufficiently satisfactory temporary bond to allow for the slower bonding action of the solvent to take place. It should of course, be understood that the above is a detailed description of the preferred form and method of the present invention, and it is not intended to be limiting, as other forms and modifications may occur to those skilled in the art which do not depart from the spirit of this invention and which come within the scope of the appended claims.

We claim:

1. A method for making decorative sheeting by attaching a plurality of preformed strips of relatively thin, flexible material along predetermined lines to one side of a backing sheet of similar material, including the steps of:
   a. applying a relatively narrow deposit of solvent between each of said strips and said backing sheet along spaced lines extending longitudinally of said strips;
   b. substantially simultaneously applying a relatively narrow deposit of adhesive between each of said strips and said backing sheet in lines alongside said solvent;
   c. ruffling said strips while substantially simultaneously bringing them into attaching relation with said backing sheet along the lines of deposit of said solvent and said adhesive; and,
   d. affixing said strips in such ruffled condition to said backing sheet initially by said adhesive and more permanently by said solvent.

2. The method of claim 1, including:
   e. applying said solvent to said backing sheet in spaced pairs of relatively thin deposits along substantially parallel spaced lines, one pair for each of said strips;
   f. substantially simultaneously applying said deposit of adhesive between said lines of solvent of each pair thereof.

3. The method of claim 1, including:
   e. ruffling said strips forcing greater lengths of said strips into engagement with a lesser length of said backing sheet along the lines of deposit of adhesive, the ruffling in said strips being initially held by said adhesive while said solvent is effecting a more permanent affixation.

4. A method of claim 1, including the additional steps of:
   e. moving said backing sheet continuously along a predetermined path;
   f. moving a plurality of said strips along spaced paths generally corresponding to said spaced deposits of solvent to the vicinity of said backing sheet at speeds greater than the speed of movement of said backing sheet to allow for said ruffling.